June 13, 1961 W. H. DU BOIS 2,988,176
VEHICLE BRAKE
Filed May 14, 1956 12 Sheets-Sheet 2

INVENTOR.
WILLIAM H. DuBois
BY John A. Young
ATTORNEY

June 13, 1961

W. H. DU BOIS 2,988,176

VEHICLE BRAKE

Filed May 14, 1956

INVENTOR.
WILLIAM H. DuBOIS
BY
John A. Young
ATTORNEY

INVENTOR.
WILLIAM H. Du Bois
BY John A. Young
ATTORNEY

June 13, 1961  W. H. DU BOIS  2,988,176
VEHICLE BRAKE

Filed May 14, 1956  12 Sheets-Sheet 6

INVENTOR.
WILLIAM H. DuBois
BY John A. Young
ATTORNEY

Fig. 12

June 13, 1961 W. H. DU BOIS 2,988,176
VEHICLE BRAKE
Filed May 14, 1956 12 Sheets-Sheet 9

INVENTOR.
WILLIAM H. DU BOIS
BY
John A. Young
ATTORNEY

June 13, 1961  W. H. DU BOIS  2,988,176
VEHICLE BRAKE

Filed May 14, 1956  12 Sheets-Sheet 10

Fig. 15

INVENTOR.
WILLIAM H. DU BOIS
BY John A. Young
ATTORNEY

INVENTOR.
WILLIAM H. DU BOIS

United States Patent Office 2,988,176
Patented June 13, 1961

2,988,176
VEHICLE BRAKE
William H. Du Bois, South Bend, Ind., assignor to The Bendix Corporation, a corporation of Delaware
Filed May 14, 1956, Ser. No. 584,608
6 Claims. (Cl. 188—73)

This invention pertains to a vehicle brake and is particularly suitable for heavy duty kinetic energy absorbing applications.

With the advent of higher vehicle speeds and heavier vehicles, it become apparent that more heat resistant friction materials must be developed and improved brake designs must be constructed to withstand the higher heats generated during brake application.

Examples of improved friction materials which are designed to successfully meet this braking heat problem are described in copending application No. 545,637, now Patent No. 2,784,105, filed as a continuation-in-part on November 8, 1955, and application No. 602,480, filed July 30, 1957, now abandoned.

The development of heat during high kinetic energy absorbing applications of brakes brings about a condition known as "fading" or loss of brake effectiveness owing to a reduction of coefficient of friction under the influence of high temperatures. It is characteristic of the linings which are described in the referenced applications, that they are highly resistant to change or loss in effectiveness under the influence of high temperatures, and it is one of the objects of this invention to provide a brake construction which takes maximum advantage of the novel characteristics of this lining.

A promising approach to the problem of high energy braking is to dissipate the heat more efficiently so that the brake parts are not elevated to as high a temperature. Since there is a relation between braking temperature and effect on brake performance, this has proved to be a sound basis for meeting the demands of high energy braking. Accordingly, it is an object of the invention to construct a brake which dissipates the heat energy as rapidly and efficiently as possible in order to avoid high temperatures which are deleterious to brake performance.

Another hazard which accompanies high speed stops is the effect of high temperature on the hydraulic system. It is possible in a hydraulically actuated brake to develop sufficient heat during high speed braking to cause vaporization of the hydraulic fluid. When this occurs, there is a partial or entire loss of applying effort on the brakes. It is one of the features of the present invention that the hydraulic motor for applying the brake is located remotely from the braking surfaces so that braking heats have less effect upon the fluid motor. Also, the fluid motor is located within a stream of air so that the fluid motor is convection cooled during brake operation.

Another feature of the invention is related to a linkage which connects the friction members and fluid motor. The linkage is provided with articulated connections to permit pivotal movement thus enabling the friction members to conform to the surface of the rotor.

Of further importance in the invention is that friction members may be either automatically or manually adjusted in any of several simplified manners which will be discussed.

Another object of the invention is to provide a brake construction which combines sufficient rigidity to withstand heavy duty braking and is yet sufficiently reduced in size to be fitted onto automotive vehicle wheels.

Other objects and features of the invention will become apparent from a consideration of the following description which proceeds with reference to the accompanying drawings, wherein:

FIGURES 7, 8, and 9 are section views taken on the corresponding section lines in FIGURE 6;

Referring to the embodiment shown in FIGURES 1 through 5, reference numeral 10 indicates generally a rotor having splined portions 11 (FIGURE 3) which are fitted to keys 12 on rotatable member 14. Rotatable member 14 which drives the rotor 10 is secured to axle flange 16 by means of bolts 17.

A torque taking member 18 is secured to a nonrotatable part of the vehicle such as a steering knuckle 20 by means of bolts 21. The torque taking member 18 consists of two centrally joined plates 22 and 24 which are axially spaced apart as they extend outwardly from the center portion thereof (see FIGURE 3). The axially spaced apart extensions of the torque plate extend along opposite sides of the rotor. Plate 24 serves as a "reaction plate" and is designated as such hereinafter. Plate 22 serves as a "carrier" for the friction units 26 and 28.

Friction units 26 and 28 are identically constructed and are circumferentially spaced around the torque taking member 18. Each friction unit includes a pair of housings 30 and 32 which are transversely mounted in carrier plate 22. A reciprocable member 34 is received in each of the housings, and carries at the one end thereof a segment of friction material lining 36 and is associated at the other end thereof with a push rod 38. End 39 of the push rod 38, which engages reciprocable member 34, is hemispherically shaped to permit slight swivelling movement of member 34, thus ensuring conformable contact between friction lining 36 and the engageable surface of the rotor 10. A spring 40 maintains the hemispherically shaped end 39 of the push rod in contact with reciprocable member 34.

The push rods 38 in each unit are joined by a cross member 42 which may be channel shaped to provide sufficient structural rigidity. The end of the push rod is threaded to receive a nut 44 which clamps cross member 42 against a shoulder 46 of the push rod. Springs 48 surround push rods 38 and are compressed between cross member 42 and housings 30 and 32, thereby developing a spring load on the cross member 42 which urges the cross member 42 away from the rotor. When the cross member 42 and push rods 38 move away from the rotor, the reciprocable members 34 being held to the ends of the push rods by springs 40, follow up this movement, and thus segments 36 are disengaged from the surface of the rotor.

Figure 1:
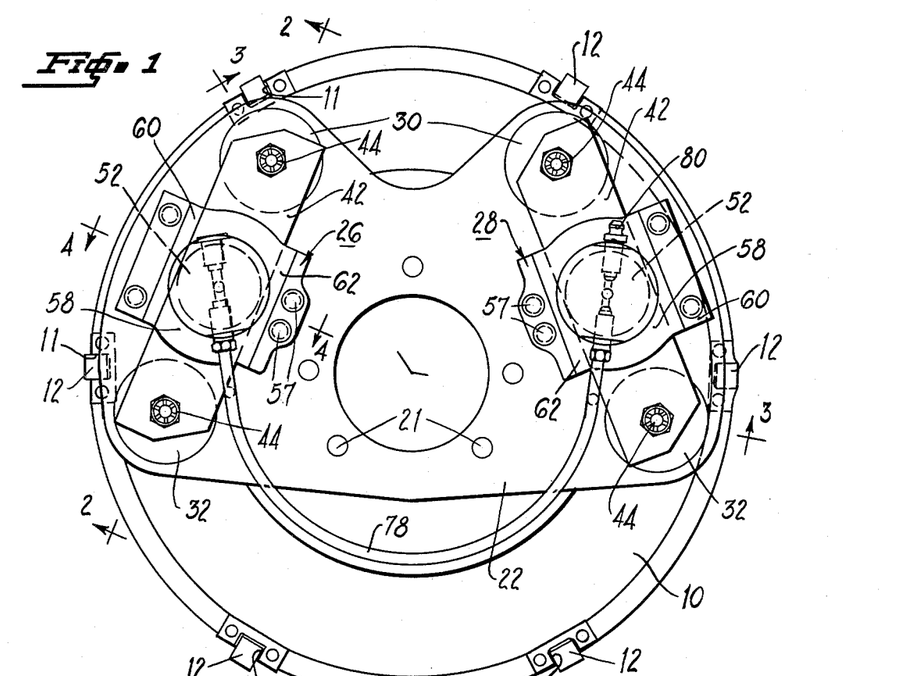
FIGURE 1 is a side elevation view of a front wheel brake constituting a first embodiment of the invention.
Figure 2:
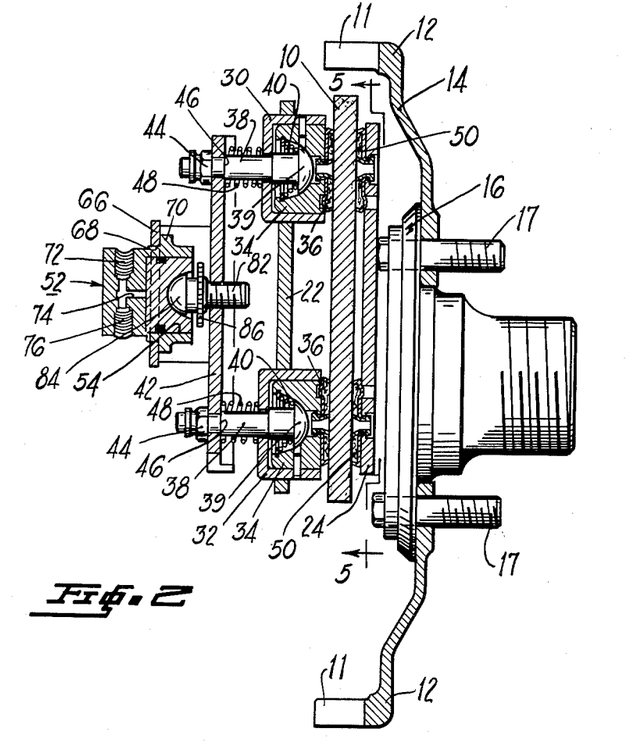
FIGURES 2, 3, and 4 are section views taken on their respective lines 2—2, 3—3, and 4—4 of FIGURE 1.

Referring to FIGURE 2, reaction plate 24 has friction segments 50 which are mounted thereon in opposed relation to friction segments 36. The friction segments 50 are engageable with the face of the rotor opposite from the face engaged by segments 36.

To actuate the brake, there is provided a fluid motor 52 for each of the units, said motor comprising a cylinder bore 54 and fluid pressure responsive piston 56. A carrier member 58 has two flanged legs 60 and 62 which are fastened to plate 22 (FIGURE 4) by means of bolts or the like 57. Legs 60 and 62 extend laterally from the torque taking member 18 and are joined by a transverse portion 66 (FIGURE 2) having an opening 68 which receives the fluid motor. An annular flange 70 of the fluid motor engages the underside of portion 66 to secure the motor in place.

Fluid motor 52 has an inlet port 72 and passages 74 which communicate fluid pressure to piston 56, and an outlet port 76 which is connected with the fluid motor in brake unit 28 through a conduit 78. The fluid motor in unit 28 is likewise provided with an inlet port and passages and also a bleed port 80 which is used to bleed hydraulic fluid from the brake system.

Between piston 56 and cross member 42 (FIGURE 2) is a threaded stem 82 with a hemispherical end 84 which is in contact with the piston. The end 84 permits slight turning movement of the stem 82 so that the applying linkage between the motor and the friction lining can tilt slightly at each articulation, thus enabling the friction lining segments 36 to conform with the engageable surface of the rotor.

Stem 82 is further provided with a serrated wheel 86 which may be turned, thus displacing the cross member 42 and other applying linkage components in either relative direction to thereby position the friction segments 36.

Return springs 48 bias the applying linkage away from the rotor and retraction of the applying linkage is limited by the piston 56 bottoming out on the base of cylinder bore 54.

Figure 3:
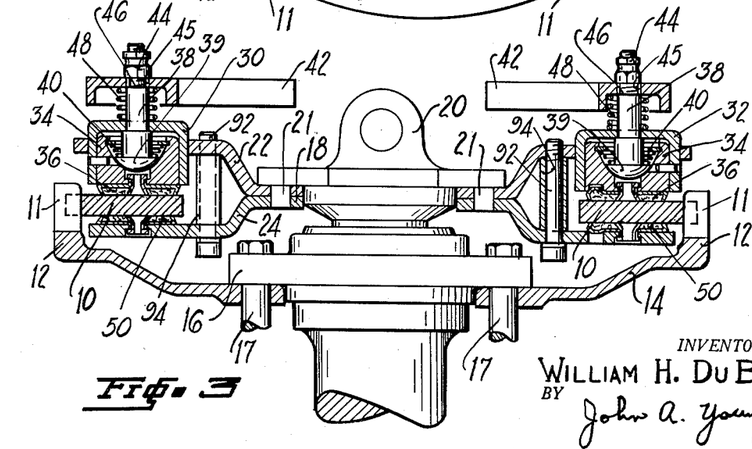
Figure 4:
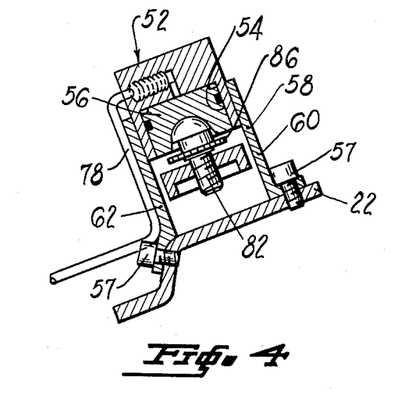
Figure 5:
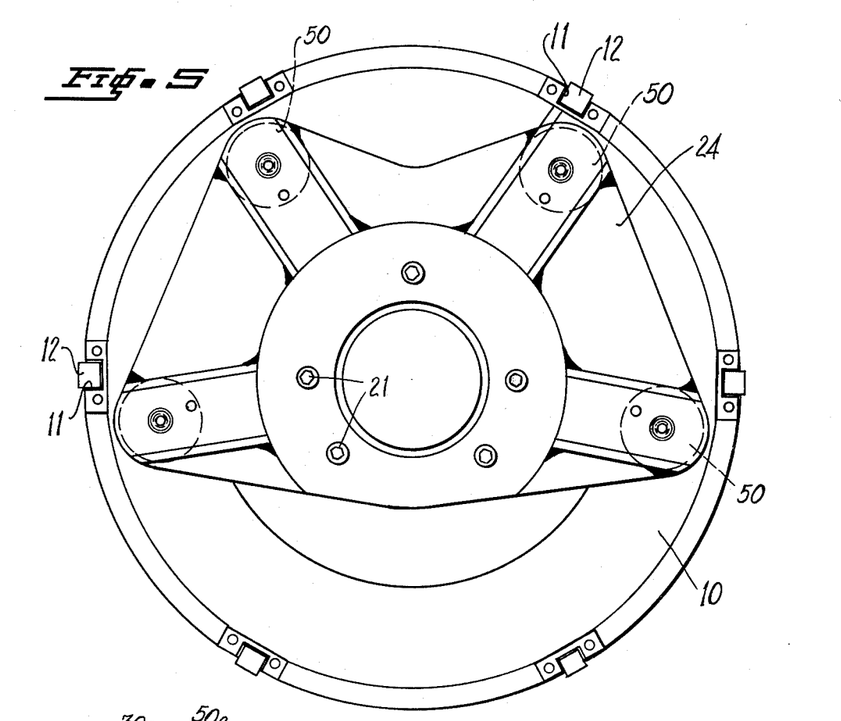
FIGURE 5 shows the reverse side of FIGURE 1 looking in the direction of the arrows 5—5 in FIGURE 2.
Figure 6:
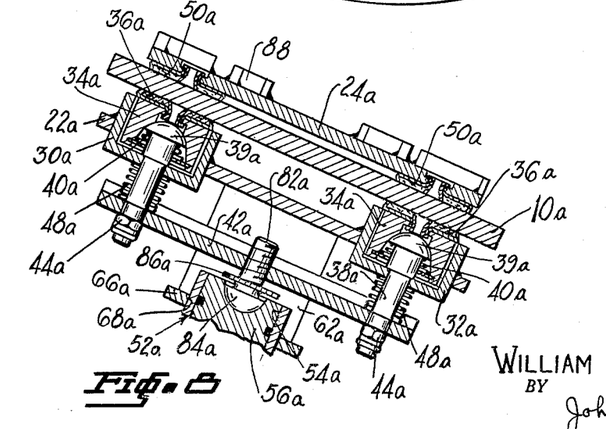
FIGURE 6 is a side elevation view of a rear wheel brake.

Referring to FIGURE 3, the axially spaced apart plates 22 and 24 are reinforced by a plurality of bolts 92 having spacer sleeves 94 which hold the plates the correct distance apart.

In operation, fluid pressure which is developed by the operator is communicated to the fluid motors 52 in friction units 26 and 28, respectively. Pistons 56 are forced toward the rotor and, acting through cross member 42 and push rods 38, the reciprocable members 34 are urged toward the rotor thus bringing friction segments 36 into forcible engagement with one surface of the rotor. The rotor, in addition to being rotatable, is permitted slight axial movement relative to driving keys 12. The rotor is thus forced into engagement with opposing friction segments 50 on reaction plate 24. The rotor is thereby clamped between opposing friction surfaces 36 and 50, and further rotation is thereby retarded to impede movement of the vehicle wheel.

When the fluid pressure is released, springs 48 bias the operating linkage, including push rods 38, cross member 42 and reciprocable members 34 away from the rotor until the piston 56 bottoms out on the base of cylinder bore 54. Friction segments 36, being held against the ends of push rods 38 are thereby disengaged from the rotor.

To adjust the brake, serrated wheel 86 is rotated to displace the operating linkage towards or away from the rotor until proper clearance has been established between friction segments 36 and the engageable surface on the rotor. It will be noted in FIGURE 3 that the openings 45 in the cross member 42 through which the ends of the push rods 38 extend are formed oversize to permit tilting movement of the push rods. This tilting movement of the push rods, and the swivelling movement made possible by hemispherical ends 39 and 84 on the push rods 38 and stem 82 allows some free movement in the linkage to compensate for unevenness of the rotor by permitting the friction segments to rock slightly in a lateral sense.

Referring next to the embodiments shown in FIGURES 6 through 10, parts of the brake corresponding to those previously described will receive the same reference numerals with subscript "a." Rotor 10a having splined portions in the outer periphery thereof is driven by a number of spaced keys 12a of a rotatable member 14a.

Secured to a fixed part of the vehicle is a torque-taking member 18a. A carrier plate 22a and reaction plate 24a are fastened to torque-taking member 18a and are laterally spaced on either side of the rotor 10a.

Each of the friction units 26a and 28a are identically constructed so that a detailed description of one will suffice for both.

Friction member 26a includes two housings 30a and 32a which are transversely fixed in carrier plate 22a. Reciprocable members 34a are received in the housings 30a and 32a and are displaceable therein by push rods 38a which are hemispherically shaped at one end thereof to permit slight swivelling movement of the reciprocable members 34a. Springs 40a maintain contact between reciprocable members 34a and the hemispherically shaped ends 39a of the push rods. A channel shaped cross member 42a joins the extended ends of the push rods 38a and springs 48a are compressed between cross member 42a and housings 30a, 32a to bias the cross member away from the rotor 10a which is mounted remotely from the braking surfaces.

A fluid motor 52a is provided to actuate each of the friction units. The fluid motor comprises a cylinder bore 54a and piston 56a which is connected to the cross members 42a by means of a threaded stem 82a. The stem has a hemispherically shaped end 84a which permits the applying linkage to pivot thereon just as in the previous embodiment. Opposed friction segments 36a and 50a are carried on the ends of reciprocable members 34a and reaction plate 24a. Referring to FIGURE 8, it will be noted that the reaction plate 24a is stiffened by means of a plurality of ribs 88.

Figure 9:
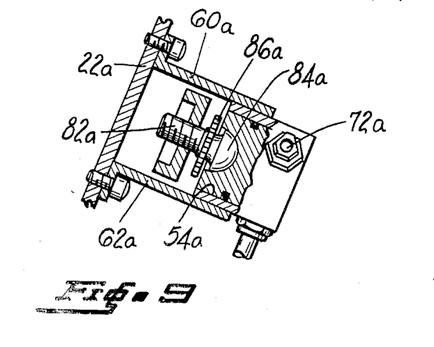
Figure 10:
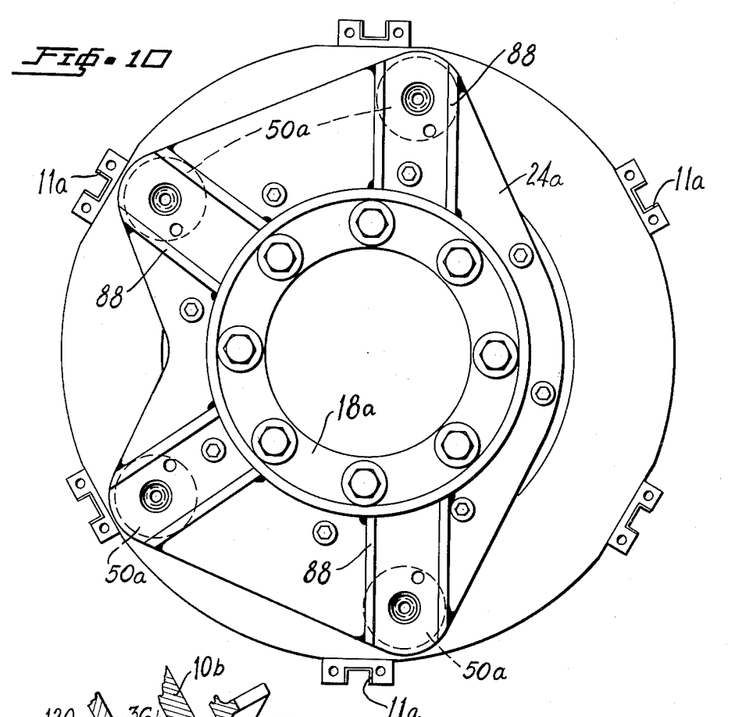
FIGURE 10 shows the reverse side of FIGURE 6, looking in the direction of the arrows 10—10 in FIGURE 7.
Figure 11:
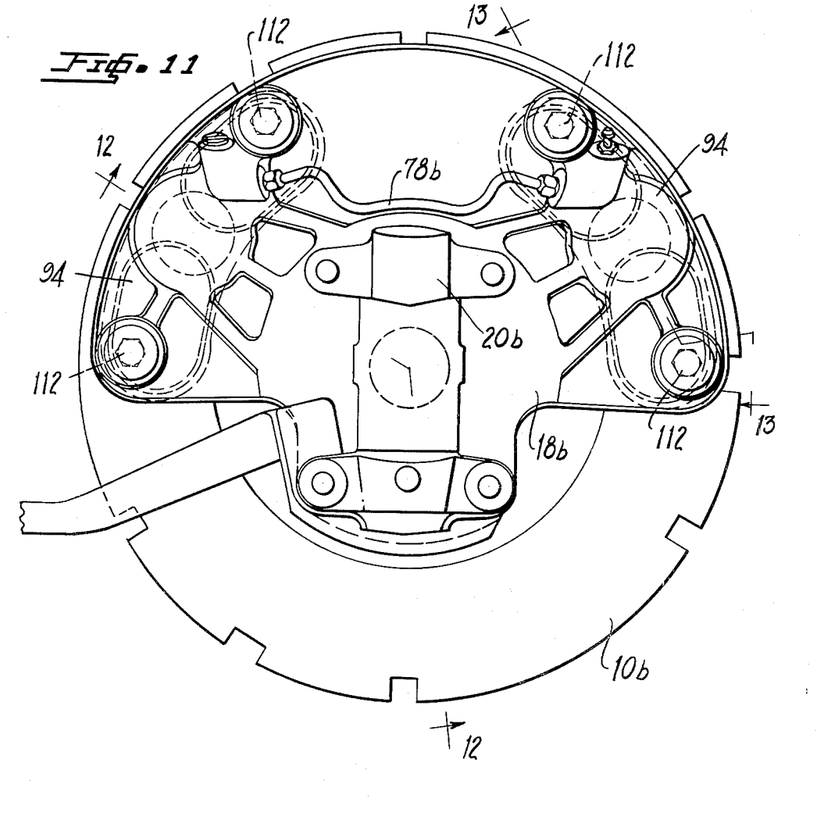
FIGURE 11 is a side elevation view of another front wheel brake assembly.
Figure 12:
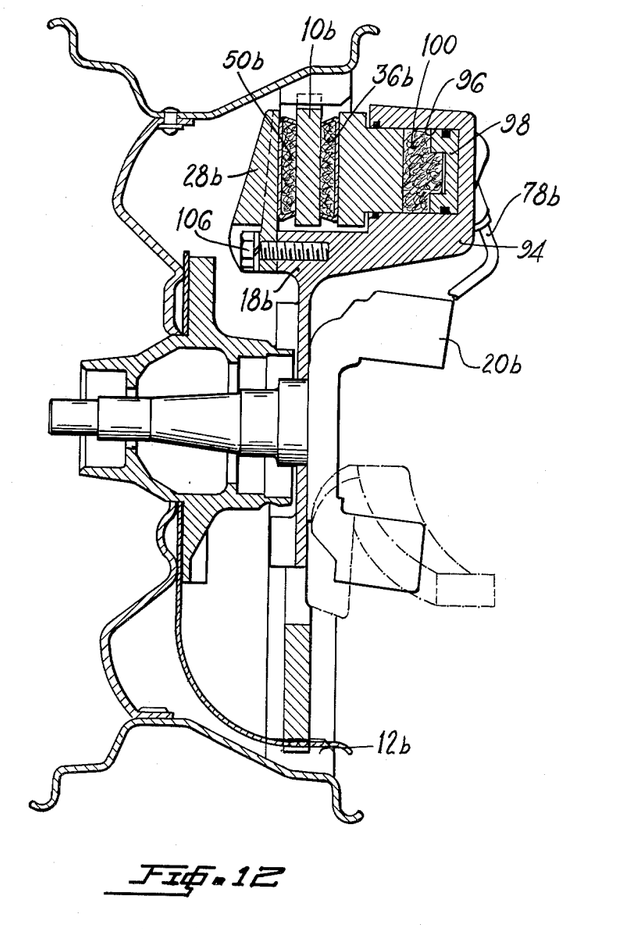
FIGURES 12 and 13 are section views taken on the corresponding section lines in FIGURE 11.
Figure 13:
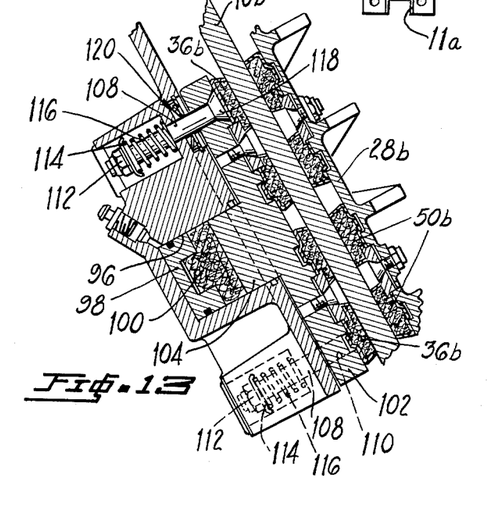
Figure 14:
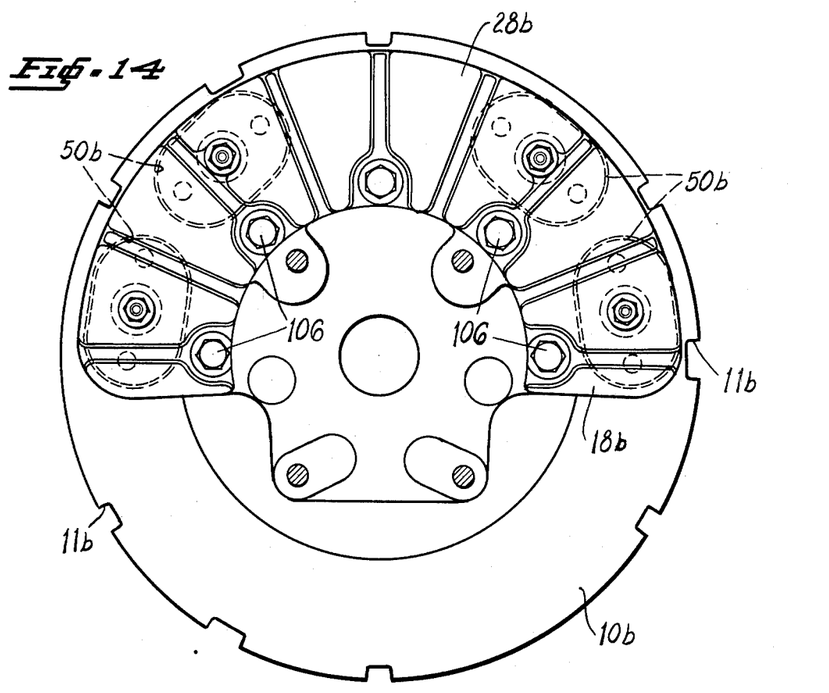
FIGURE 14 shows the reverse side of FIGURE 11.
Figure 15:
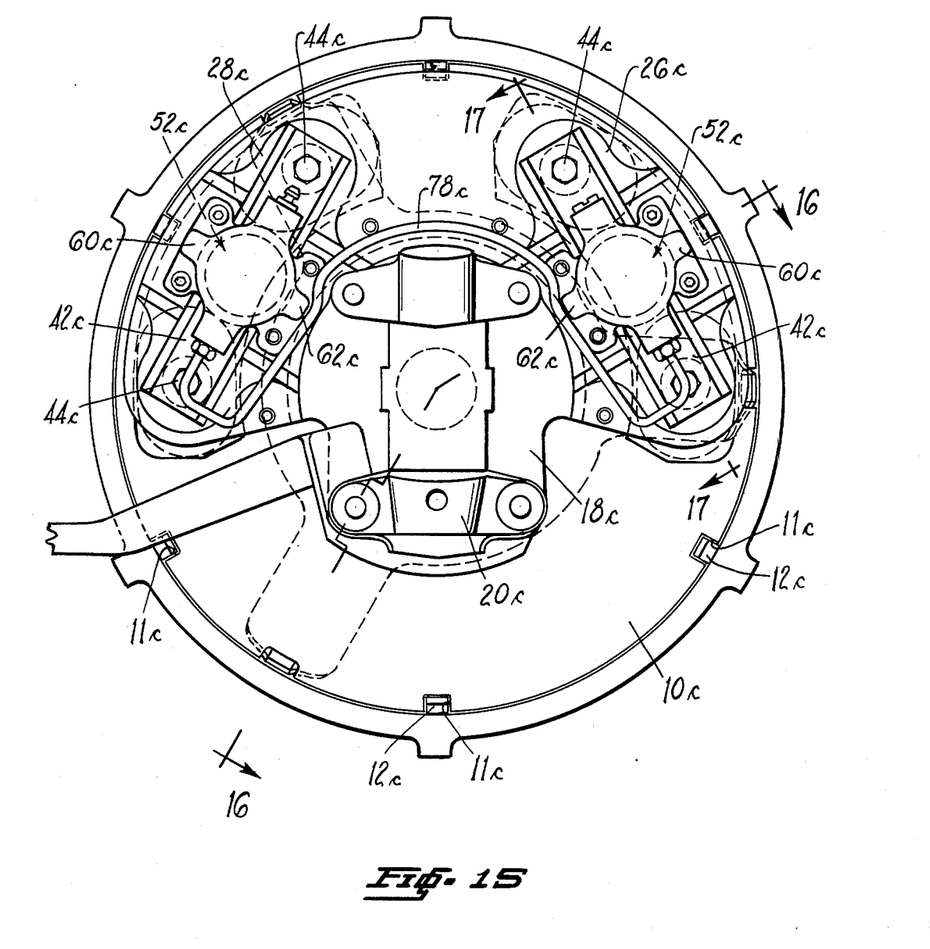
FIGURE 15 is a side elevation of the rear wheel brakes used in conjunction with the FIGURE 11.
Figure 16:
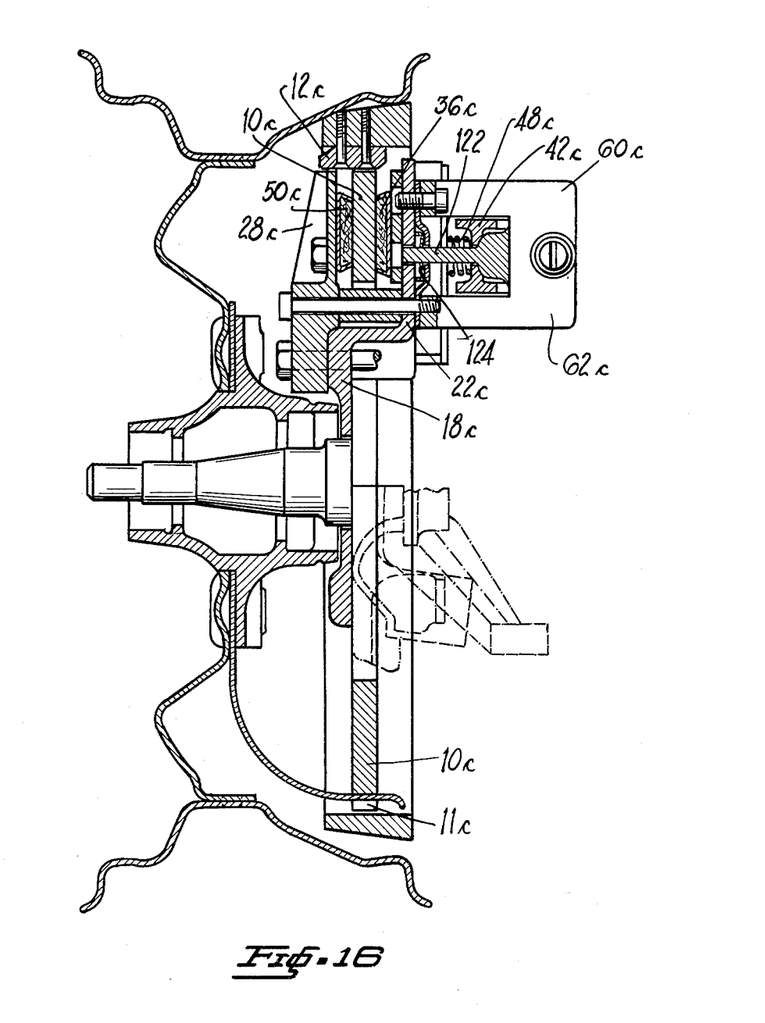
FIGURES 16 and 17 are section views taken on the respective section lines 16—16 and 17—17 of FIGURE 15.
Figure 17:
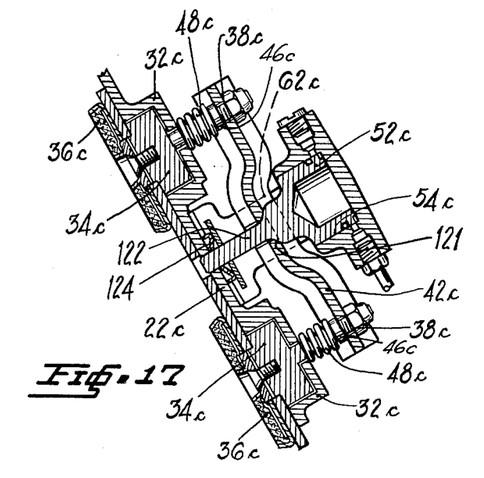
Figure 18:
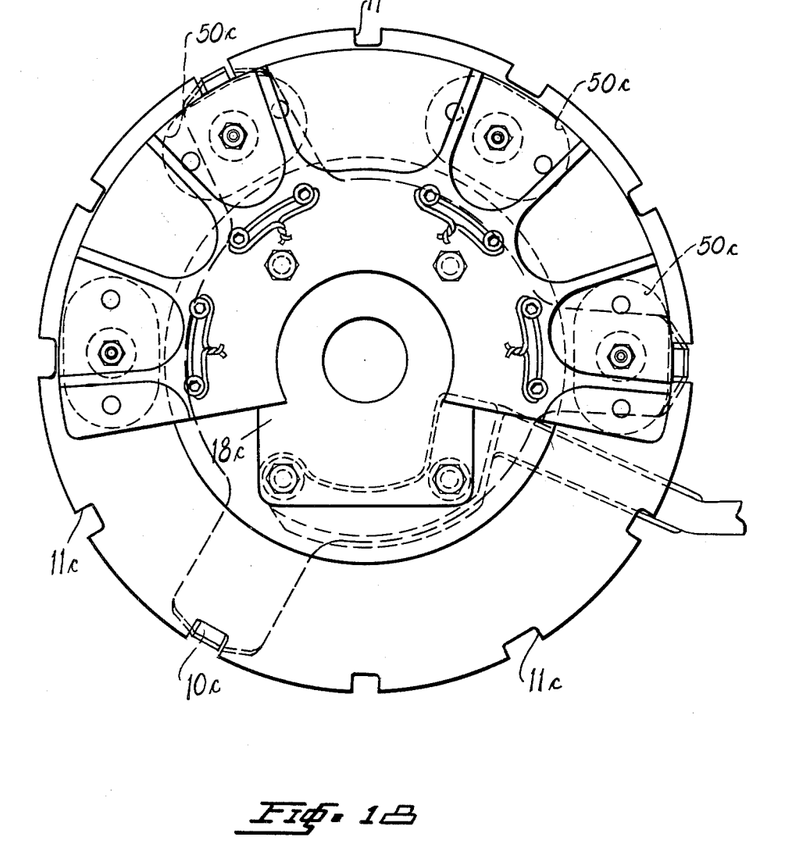
FIGURE 18 shows the reverse side of FIGURE 15.

The fluid motor is carried by two laterally extending flanged legs 60a and 62a which are fixed to carrier plate 22a in the manner indicated in FIGURE 9. Legs 60a and 62a are joined by an integral transverse portion 66a (FIGURE 8) having an opening 68a therein which receives the cylinder 54a.

Figure 7:
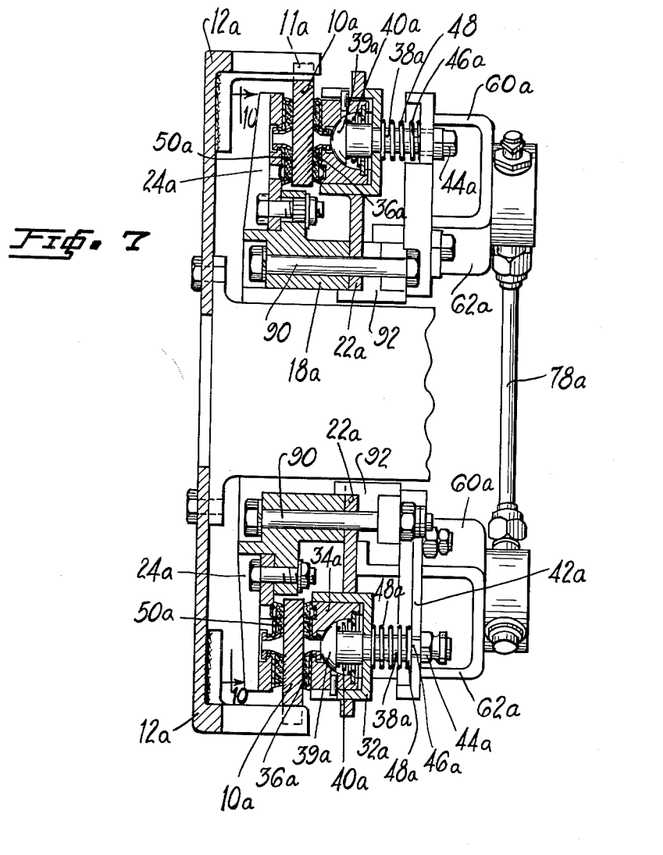

The brake construction shown in FIGURES 6 through 10 is substantially the same as the front wheel brake except that the carrier plate 22a and reaction plate 24a are separately secured to a torque taking member 18a as indicated in FIGURE 7. Note in FIGURE 7 that through bolts 90 in addition to mounting the carrier plate to the torque taking member also serve to fasten the torque-taking member to mounting flange 92. The rotor in this embodiment is secured to the axle housing instead of the axle flange.

There is limited play between the parts of the operating linkage, the purpose of this being to enable the friction segments 36a to conform to the engageable surface of the rotor. Thus, the hemispherical ends 39a of the push rods 38a permit reciprocable members 34a to swivel slightly, the openings 41a in the cross member 42a through which the push rods 38a extend, is oversize to permit a slight turning movement of the push rods. The hemispherical end 84a (FIGURE 9) of threaded stem 82a permits a slight tipping movement of the cross member 42a to insure equalization of applying effort on the friction segments of the opposite ends thereof. Thus, the connections throughout the applying linkage permit sufficient free play so that the friction segments 36a can conform to the engageable surface of the rotor even though there exists some irregularities in the surface of the rotor.

The fluid motor 52a associated with the respective friction unit is actuated, the rotor is clamped between the opposed friction segments on the reciprocable members 34a and reaction plate 24a, respectively. When the pressure is relieved, return springs 48a return the applying linkage to its normal condition, and thereby retracting friction segments 36a from the rotor.

Referring next to the embodiment shown in FIGURES 11 through 14, parts of the brake corresponding to those in the previous embodiments will receive the same reference numeral but further include the subscript "b." Rotor 10b is driven at the outer periphery thereof through a splined connection 11b with a plurality of keys 12b, the keys being joined to the rim of the wheel. Torque taking member 18b is joined to a fixed part of the vehicle, such as a spindle 20b by means of bolts or the like (not shown). Torque taking member 18b has a laterally offset portion 94 having a cylinder bore 96 formed therein. Piston 98 is mounted for reciprocable movement in cylinder bore 96.

The piston 98 acts through a packing 100 of heat insulating material which shields the hydraulic fluid from braking heats. A flat backing member 102 (FIGURE 13) is provided with a boss 104 which is received in the cylinder bore 96 ahead of the packing 100. Segments 36b of friction material are carried by the backing member 102 and are forced into frictional engagement with one surface of the rotor 10b.

A reaction plate 28b which is fastened to torque-taking member 18b by bolts 106 (FIGURE 12) extends along one side of the rotor. Friction segments 50b which are mounted on the reaction plate 28b are located in opposed relation to friction segments 36b which are fastened to carrier member 102. On either side of the fluid motor (FIGURE 13) are rods 108 which extend through an opening 110 in laterally offset portion 94. The rods 108 are threaded to receive nuts 112 and washers 114 which compress springs 116 to develop a spring load tending to bias rods 108 away from the rotor. Since the ends 118 of the rods are riveted to the backing member 102, the backing member and friction segments 36b are withdrawn from the rotor.

To adjust for wear of the friction segments, a canted washer 120 (FIGURE 13) in combination with each of the rods 108 serves as a one-way clutch, which limits retractive movement of rod 108 to a predetermined amount. The carrier member is thus displaced by adjustable increments toward the rotor to maintain a desired clearance between the friction segments and the engageable surface of the rotor.

Fluid pressure for actuation of the brake is distributed to the motor in friction unit 26a via inlet port 72b and inlet passage 74b. The fluid pressure in the fluid motor of unit 26b is communicated to the fluid motor in unit 28b through an external conduit 78b, which is further provided with a bleed port 80b from which fluid can be bled from both of the fluid motors.

When the brake is applied, pistons 98 are forced toward the rotor thus bringing friction segments 36b into forcible engagement with one surface of the rotor. The rotor, being splined, is also moved in a lateral direction against opposing friction segments 50b. The rotor is thus clamped between segments 38b and 50b. When the brake pressure is relieved, springs 116, acting through rods 108 disengage friction segments 36b from the rotor 10b, the retracted position of friction segments being determined by operation of the automatic adjuster 120.

As in the previous embodiments, the fluid motor is displaced axially from the braking surfaces and is located within the stream of air passing around the front wheels of the vehicle. The current of air abstracts heat from the fluid motor, thus maintaining the temperature low enough to avoid problems of hydraulic fluid boiling.

Referring next to the brakes shown in FIGURES 15 through 18, the reference numerals will be the same where parts correspond to those previously described but will further include the subscript "c." Rotor 10c is driven at the outer periphery thereof through a splined connection 11c with a plurality of spaced keys 12c which are fastened to the rim of a vehicle wheel. Torque taking member 18c has a portion 22c thereof which is laterally offset to serve as a carrier for fluid motor actuation 52c and piston segments 36c. Portion 22c extends along one side of the rotor, and reaction plate 24c which is secured to torque taking member 18c by means of a number of spaced threaded stems 90c extends along the opposite side of the rotor.

Housing members 32c (FIGURE 17) are formed with carrier plate 22c. Two identically constructed friction units 26c and 28c are provided, each including a pair of friction segments 36c and a fluid motor actuator 52c. Fluid motor 52c is located remotely from the braking surfaces. The fluid motor is carried by two transversely extending legs 60c and 62c the same as in the previous embodiments. Between the fluid motor actuator and friction segments 36c is an operating linkage including reciprocable members 34c having integrally formed push rods 38c and a cross member 42c which connects the adjacent extending ends of the push rods. Fluid motor actuator 52c (FIGURE 17) consists of a cylinder bore 54c and piston 52c which acts against the operating linkage through a shoulder 121.

Return springs 48c bear at one end against housings 32c and at the other end against cross member 42c to bias the operating linkage to a retracted position, thus disengaging friction segments 36c with the rotor.

Piston 52c is formed with an elongated extension 122 which passes through a one way clutch 124 serving to limit retractile movement of the piston. Movement of the piston in an applying position is permitted, however, to actuate the brake.

When the fluid motor is operated, movement of the piston forces the applying linkage toward the rotor, thus forcibly engaging friction segments 36c against one side of the rotor 10c. The rotor, being splined also, moves axially into engagement with friction segments 50c on the reaction plate 24c. The rotor is thus clamped between the opposed friction segments on reciprocable members 34c and the reaction plate, respectively.

When the fluid pressure is relieved, springs 48c return the operating linkage to the extent permitted by clutch 124 which holds the piston against retractile movement beyond that necessary to establish proper clearance between friction segments 36c and the engageable surface of the rotor.

It will be noted that this embodiment differs from previous embodiments in that the automatic adjustor is associated with the fluid motor and the housing members are constructed integrally with the carrier plate rather than separately therefrom.

Although certain selected embodiments of the invention have been described to illustrate the invention, it will be understood that these are merely exemplary of the invention and are not restrictive thereof.

I claim:

1. In a brake, a rotor having splines on the outer periphery thereof for driving said rotor and permitting limited axial movement thereof, two circumferentially spaced friction segments which are held fixed on one side of said rotor, two circumferentially spaced axially movable friction segments on the opposite side of said rotor and engageable with said rotor to clamp said rotor between the friction segments on opposite sides thereof, two reciprocable members secured respectively to said movable friction segments for positioning said movable friction segments into and out of engagement with said rotor, a transverse force transmitting member having a connection at opposite ends thereof respectively to engage each of said reciprocable members to transmit an actuating thrust thereto, said connection having means permitting relative angular movement between said reciprocable members and said transverse force transmitting member, a fluid motor actuator disposed remotely from said rotor connected to said force transmitting member to apply an actuating thrust at the approximate center thereof, and yieldable means connected to said force transmitting member for returning said force transmitting member and said reciprocable members when said actuating thrust is not being applied.

2. In a brake, a rotor having splines on the outer periphery thereof for driving said rotor and permitting limited axial movement thereof, two circumferentially spaced friction segments which are held fixed on one side of said rotor, two circumferentially spaced axially movable friction segments on the opposite side of said rotor and engageable with said rotor to clamp said rotor between the friction segments on opposite sides thereof, a pair of plungers arranged substantially perpendicularly to the face of said rotor and connected one with each of the respective axially movable friction segments, a floating transverse force transmitting member having a connection at opposite ends thereof respectively to engage each of the plungers comprising said pair of plungers to transmit an actuating thrust thereto, said connection having means permitting relative angular movement between said plungers and said transverse force transmitting member, a fluid motor actuator disposed remotely from said rotor connected to said force transmitting member to apply an actuating thrust at the approximate center thereof, and yieldable means connected to said force transmitting member for returning said force transmitting member and said friction segments when said actuating thrust is not being applied.

3. In a brake as claimed in claim 2 including means having a spherically formed surface interconnecting said axially movable friction segments and said plungers to permit relative swivable movement therebetween.

4. In a brake as claimed in claim 2 including means permitting swivable relative movement between said axially movable friction segments and said plungers.

5. In a brake as claimed in claim 2 wherein said plungers are fixedly secured to said friction segments.

6. In a brake, a rotor, a bifurcated torque-taking member extending along opposed surfaces of said rotor, oppositely-acting friction members carried by the respective furcations of said torque-taking member, a laterally extending projection on each of said friction members at one side of said rotor, means connecting the ends of said laterally extending projections, a spring surrounding each of said projections and interposed between said means and said torque taking member, said spring being operative to load said means and said projection in a direction away from said rotor to thereby position said friction member associated therewith in a normally retracted position, a fluid motor acting through said means and projections to forcibly apply the friction members against the sides of said rotor, and an automatic adjuster in combination with said fluid motor which controls the piston location therein to thereby position said friction members.

References Cited in the file of this patent

UNITED STATES PATENTS

| | | | |
|---|---|---|---|
| 1,758,370 | Olsen et al. | May 13, | 1930 |
| 2,174,395 | Aikman | Sept. 26, | 1939 |
| 2,219,196 | Nystrom | Oct. 22, | 1940 |
| 2,277,106 | Hewitt | Mar. 24, | 1942 |
| 2,304,368 | Milan | Dec. 8, | 1942 |
| 2,620,054 | Munschauer | Dec. 2, | 1952 |
| 2,655,229 | Eksergian | Oct. 13, | 1953 |
| 2,655,230 | Buyze | Oct. 13, | 1953 |
| 2,657,773 | Driscoll | Nov. 3, | 1953 |
| 2,663,384 | Chamberlain | Dec. 22, | 1953 |
| 2,746,254 | Lucien | May 22, | 1956 |
| 2,768,710 | Butler | Oct. 30, | 1956 |
| 2,773,567 | Fairchild | Dec. 11, | 1956 |

FOREIGN PATENTS

| | | | |
|---|---|---|---|
| 635,603 | Great Britain | Apr. 12, | 1950 |
| 638,561 | Great Britain | June 14, | 1950 |
| 1,078,395 | France | Nov. 17, | 1954 |